Jan. 24, 1950  H. BODLANDER  2,495,223
CAMERA AND FOLDING LENS MOUNT THEREFOR
Filed March 31, 1948
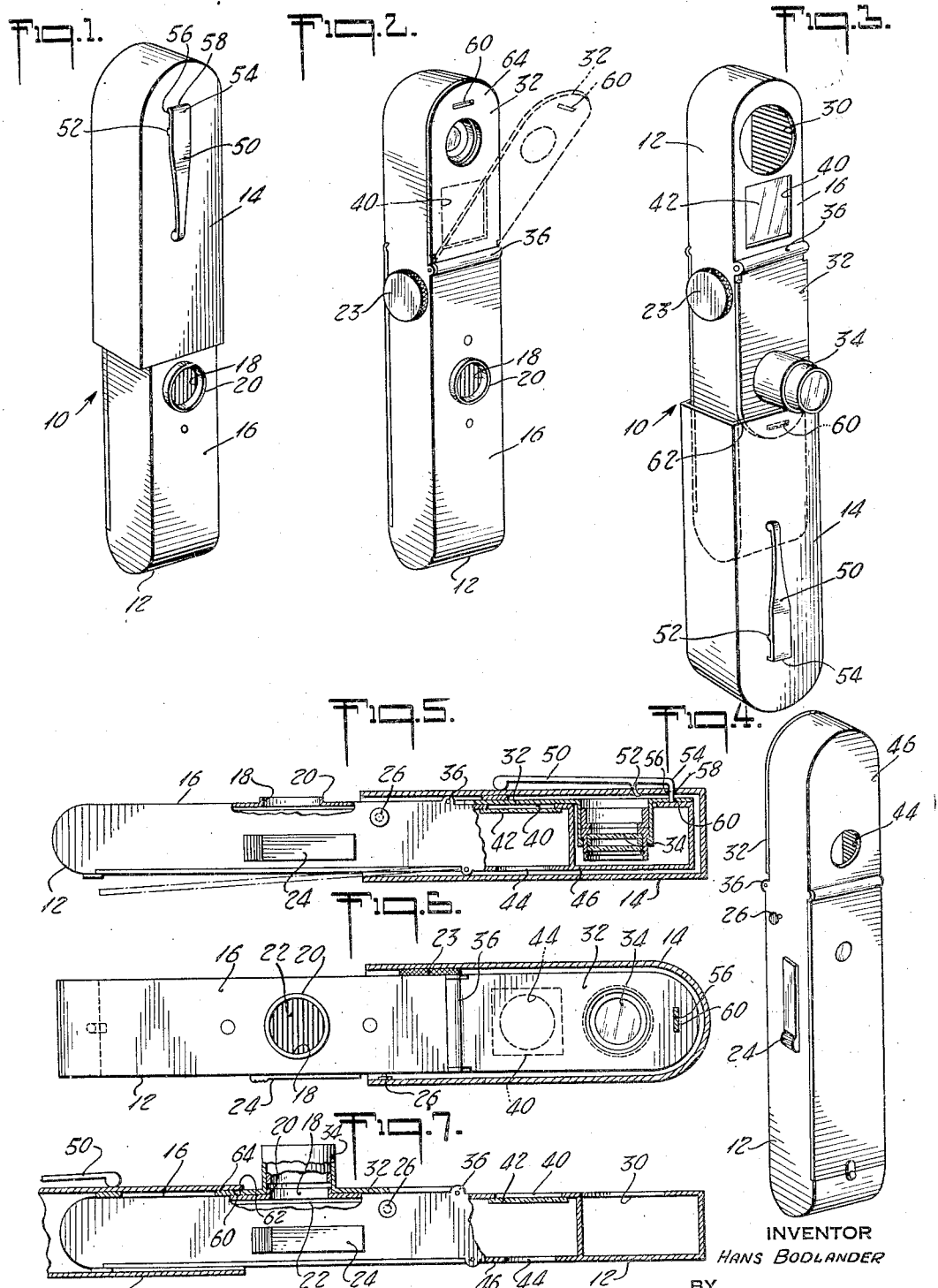
INVENTOR
HANS BODLANDER
BY
Schaines + Lieberman
ATTORNEYS Patented Jan. 24, 1950

2,495,223

UNITED STATES PATENT OFFICE 2,495,223

CAMERA AND FOLDING LENS MOUNT THEREFOR

Hans Bodlander, Forest Hills, N. Y.

Application March 31, 1948, Serial No. 18,267

2 Claims. (Cl. 95—11)

The present invention relates generally to the field of photography. In particular, it relates to camera construction; that is, the manner in which the film containing casing is formed and how the lens is mounted thereon.

The general object of the present invention consists in the provision of a camera which uses narrow film, such as cine film, the camera being of small size, narrow and elongated in shape, having smooth contours and a minimum of protuberances, can be handled and readied for use easily, and carried like a conventional fountain pen.

Small cameras have been known in the past, and are in use at the present time. Most of these small cameras have gone to extremes in design, presenting cameras which are so small as to make their use and handling an extremely delicate and difficult matter. The presently conventional small cameras are rather expensive in their intricacies; certain thereof use specially sized, extremely narrow film which is not always obtainable, requiring the use of a very short focus lens and thereby adversely affecting the perspectives, requiring the use of special film containers, special processing conditions and the like.

With the camera of my invention, it will be possible to use conventional cine film, and while my invention is not to be limited thereto, it will be described in connection with a camera using 16 mm. film, film which is readily and easily obtainable, and which presents no processing problems.

The main specific object of the present invention is the provision of a camera which comprises a casing having a light-admitting opening thereinto, through which opening film activating light may pass, and a second opening into the camera spaced from the first, a lens for the camera so mounted on the casing as to alternately make it possible to position the lens in front of the first opening for use in taking pictures, or within the casing through the second opening for storage when no pictures are to be taken; the alternative positions being achieved easily, quickly and simply.

Another specific object of the present invention is the provision of a camera comprising a casing having an elongated flat front wall, a lens for said camera, the lens being mounted on a plate which is swingable to position the lens in front of the camera for picture taking, or to position the lens within the camera when not in use.

Other and further objects, as the nature, construction and operation of the lens plate, the various camera openings and the like, will in part be apparent from the following description of an illustrative embodiment, and in part more specifically pointed out hereinafter.

In the drawings annexed hereto and forming a part hereof,

Figure 1 is a perspective view of one form of device constructed according to and embodying the present invention, the camera body being shown with the cap thereon in "at rest" position;

Fig. 2 is a similar view but with the cap removed, and showing the pivoting movement of the lens plate in dotted lines;

Fig. 3 is a slightly enlarged perspective view showing the device with the cap over the opposite end of the camera, in the "ready for use" position;

Fig. 4 is a perspective view of the camera body, seen from the rear;

Fig. 5 is a part top plan, part horizontal section lengthwise of the camera body and cap thereon, as in Fig. 1;

Fig. 6 is a part front elevational, part vertical section of the camera and cap as in Fig. 1; and Fig. 7 is a part top plan, part horizontal section showing the parts as in Fig. 3.

The device of my invention is indicated generally by reference numeral 10, and comprises a body portion 12 and a cap portion 14. As seen in the several figures of the drawings, the camera body 12 is relatively long and narrow, and may be so contoured as to resemble the conventional fountain pen. However, within the limitations of the film to be used, the camera may be so dimensioned, and the edges and ends of the body may be rounded, so as to present a smoothly contoured and graceful appearance, and to make the camera easier to handle and operate. While the camera of the present invention is not to be so limited, I will describe same herein with relation to the use of film substantially as wide as the conventional 16 mm. motion picture film. There is, of course, no limitation as to size of film, and my invention may be applied to wider or narrower film sizes.

The present invention relates solely and only to the construction of the camera body per se. Other and particular features thereof are the subject of the co-pending patent application Serial No. 18,268, filed March 31, 1948.

The front wall 16 of camera body 12 is provided with a plurality of openings. One thereof, indicated by reference numeral 18, may be located substantially centrally of the body length, and may be provided with a raised collar 20 extending outwardly from the front wall 16. Inside casing 12 and behind opening 18 and shoulder 20, there is disposed the camera shutter indicated generally by reference numeral 22. The film guiding means, spools, etc., will be disposed within the interior of the body 12 as will be readily understood, and no further reference thereto will be made herein, other than that the film movement may be handled through winding knob as 23 on the bottom of the camera body. The shutter tensioning may be handled through slide 24 located on the top of the camera body, and the shutter release may be actuated as by means of a button as 26 situated also on top of the camera. These controls, 23, 24, 26 may be located in various positions, the positions here shown being merely for illustrative purposes.

A second opening as 30 is formed in the front wall, spaced from opening 18. Midway between openings 18 and 30, a flat plate 32 is hinged to wall 16 as at 36, for movement back and forth against front wall 16 as indicated by the dotted lines of Fig. 2. A suitable lens 34 is mounted on plate 32, and when the plate 32 is swung about hinge 36 so as to lie flatly against the end of the camera body, the lens 34 is received within the hollow camera body through opening 30, as shown in Figs. 2 and 5. The lens 34 and plate 32 are disposed in this position when the camera is "at rest" presenting an elongated and narrow outline, with no protuberances other than the controls 23, 24, 26, which are normally substantially flush with the camera top and bottom walls.

When it is desired to ready the camera for use, plate 32 is swung out from the body, bearing lens 34 with it, and turned through an arc of 180°, and disposed flatly against the wall 16, with lens 34 lining up with opening 18, and the lens mount fitting about the locating shoulder 20, as seen in Figs. 3 and 7.

A third opening 40 is formed in front wall 16, behind which is disposed a glass plate or other viewing lens 42. Transversely aligned with opening 40 in the front wall, there is provided a smaller opening 44 in the rear panel 46 of the camera body. When it is desired to "view" the picture to be taken, the rear panel 46 of the camera is held to the eye, and through openings 44, 40 the field covered by the lens 34 may be seen. As will be readily understood from Figs. 2 and 5, the view finder window 40 is covered by plate 32 when the camera is not in use.

Suitable stop or catch means may be provided to releasably secure place 32 in the "at rest" position of Figs. 1, 2, 4, 5 and 6, or in the open "ready-for-use" position of Figs. 3 and 7. However, I have provided such means in combination with means for supporting the camera on the clothing of the user, in the same manner as a fountain pen or pencil is supported.

A cap 14 is provided, of such dimension as to closely and slidably fit over the ends of the camera body 12. Cap 14 is also narrow and elongated, and is, of course, hollowed to receive camera body 12 therewithin. A clip 50 is provided on one wall of the cap, extending lengthwise thereof, the clip being secured to the cap at a point 52 spaced slightly from the upper end thereof 54, and spring held at 52 so that the upper end 54 of the clip may be pulled outwardly from the cap. Clip end 54 is provided with an inwardly directed finger 56 extending through a suitable opening 58 in the cap. As seen in Figs. 2 and 5, a transverse notch or groove 60 is formed in plate 32, which is engageable by clip finger 56 when the parts are in the position of Figs. 1, 5 and 6, thus securely holding plate 32 in the "at rest" position and locking cap 14 to camera body 12. To release finger 56, clip 50 is pulled against the tensioning of the spring at 52, finger 56 withdrawn from notch 60, and cap 14 slid outwardly and away from the camera. Plate 32 is then swung about its hinged connection 36 and lens 34 positioned for use about collar 20 over opening 18. Cap 14 may then be slid over the other end of the camera body to the point where the lower edge 62 of cap 14 overlies the tip end 64 of plate 32 and friction grips same, as will be readily understood. Other means may be employed from cap 14 to lock plate 32 in its alternate positions.

Having now described my invention, what I claim and desire to secure by Letters Patent is:

1. A camera comprising an elongated fountain pen-like casing having front, rear, top and bottom walls, an opening in the front wall to pass light rays for picture taking, a recess within the casing in from the front wall thereof spaced from the opening, a plate pivotally mounted on the front wall midway between the opening and the recess, said plate being swingable to lie against the body on both sides of the pivot point, a lens on the plate, the plate in one position thereof against the front wall positioning the lens within the recess, and in another position thereof against the front wall positioning the lens in alignment with the opening for picture taking, means to releasably secure the plate in said alternate positions, said means comprising a cap for the camera casing, friction fittable over both ends thereof, the cap fitting over the casing to hold the plate with the lens thereon in the one position thereof within the recess, and fitting over the other end of the casing to hold the plate with the lens thereon in the other position thereof in alignment with the opening for picture taking.

2. A camera comprising an elongated fountain pen-like casing having front, rear, top and bottom walls, an opening in the front wall to pass light rays for picture taking, a recess within the casing in from the front wall thereof spaced from the opening, a plate pivotally mounted on the front wall midway between the opening and the recess, said plate being swingable to lie against the body on both sides of the pivot point, a lens on the plate, movement of the plate in position thereof against the front wall positioning the lens within the recess, and in another position thereof against the front wall positioning the lens in alignment with the opening for picture taking, means to releasably secure the plate in said alternate positions, said means comprising a cap for the camera casing, friction fittable over both ends thereof, the cap fitting over the casing and plate to hold the plate with the lens thereon in the one position thereof within the recess, and fitting over the other end of the casing to overlie and engage an edge of the plate with the lens thereon to maintain same in the other position thereof in alignment with the opening for picture taking.

HANS BODLANDER.

REFERENCES CITED

The following references are of record in the file of this patent:

UNITED STATES PATENTS

| Number | Name | Date |
|---|---|---|
| 728,977 | Rancoule | May 26, 1903 |
| 785,239 | Thornton | Mar. 21, 1905 |
| 1,989,454 | Koster | Jan. 29, 1935 |

FOREIGN PATENTS

| Number | Country | Date |
|---|---|---|
| 323,005 | Germany | July 13, 1920 |
| 563,238 | Germany | Nov. 4, 1932 |